(12) United States Patent
Son et al.

(10) Patent No.: US 12,151,607 B2
(45) Date of Patent: *Nov. 26, 2024

(54) VEHICLE INCLUDING ELECTRIC MOTOR AND METHOD OF CONTROLLING BRAKE LAMP FOR THE SAME

(71) Applicants: Hyundai Motor Company, Seoul (KR); Kia Corporation, Seoul (KR)

(72) Inventors: Hui Un Son, Gyeonggi-do (KR); Sang Joon Kim, Seoul (KR); Kyu Hwan Jo, Gyeonggi-do (KR); Sung Bae Jeon, Gyeonggi-do (KR); Sung Hoon Yu, Gyeonggi-Do (KR); Joo Young Kim, Gyeonggi-do (KR); Jin Kyeom Cho, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,450

(22) Filed: Nov. 2, 2023

(65) Prior Publication Data
US 2024/0067079 A1    Feb. 29, 2024

Related U.S. Application Data

(63) Continuation of application No. 16/921,121, filed on Jul. 6, 2020, now Pat. No. 11,833,960.

(51) Int. Cl.
  B60Q 1/44    (2006.01)
  B60L 7/18    (2006.01)
  (Continued)

(52) U.S. Cl.
  CPC .......... B60Q 1/441 (2013.01); B60L 7/18 (2013.01); B60Q 11/005 (2013.01); B60T 7/042 (2013.01)

(58) Field of Classification Search
  CPC ...... B60W 20/00; B60W 20/14; B60W 10/08; B60W 10/18; B60W 10/184;
  (Continued)

(56) References Cited

U.S. PATENT DOCUMENTS

| | | | |
|---|---|---|---|
| 6,628,197 B1 * | 9/2003 | Poguntke | B60T 8/00 340/463 |
| 7,167,783 B2 * | 1/2007 | Park | B60W 20/11 701/22 |
| 9,751,517 B2 | 9/2017 | Choi | |

FOREIGN PATENT DOCUMENTS

| | | |
|---|---|---|
| JP | 2014-076715 A | 5/2014 |
| JP | 2015-123756 A | 7/2015 |

(Continued)

OTHER PUBLICATIONS

Notice of Allowance issued Aug. 28, 2024 in Korean Patent Application No. 10-2019-0123649.

*Primary Examiner* — Anthony R Jimenez
(74) *Attorney, Agent, or Firm* — Fox Rothschild LLP

(57) ABSTRACT

A brake lamp control method of a vehicle is provided. The method includes determining whether a deceleration of the vehicle based on regenerative brake through the electric motor is present in a hysteresis period between an off threshold as a reference for turning off a brake lamp and an on threshold as a reference for turning on the brake lamp. When the deceleration of the vehicle is present in the hysteresis period, the method includes determining a state of the brake lamp before the deceleration of the vehicle enters the hysteresis period. In response to determining that the brake lamp is turned on or off for a reason except for the regenerative brake before the deceleration of the vehicle enters the hysteresis period, a request for turning on the (Continued)

brake lamp is set or reset based on the regenerative brake in response to the determined state of the brake lamp.

19 Claims, 14 Drawing Sheets

(51) Int. Cl.
*B60Q 11/00* (2006.01)
*B60T 7/04* (2006.01)

(58) Field of Classification Search
CPC .. B60W 10/188; B60W 10/192; B60W 30/00; B60W 30/18109; B60W 30/18063; B60W 30/18072; B60W 30/18127; B60W 2510/18; B60W 2710/18; B60L 7/00; B60L 7/10; B60L 7/12; B60L 7/14; B60L 7/16; B60L 7/18; B60T 7/02; B60T 7/04; B60T 7/042; B60Q 1/00; B60Q 1/44; B60Q 1/441; B60Q 1/442; B60Q 1/444; B60Q 1/445; B60Q 1/447; B60Q 11/00; B60Q 11/005
USPC ...................................................... 200/61.89
See application file for complete search history.

(56) References Cited

FOREIGN PATENT DOCUMENTS

| | | |
|---|---|---|
| JP | 2016-021177 A | 2/2016 |
| JP | 2016-117437 A | 6/2016 |
| KR | 10-1807068 B1 | 12/2017 |

\* cited by examiner

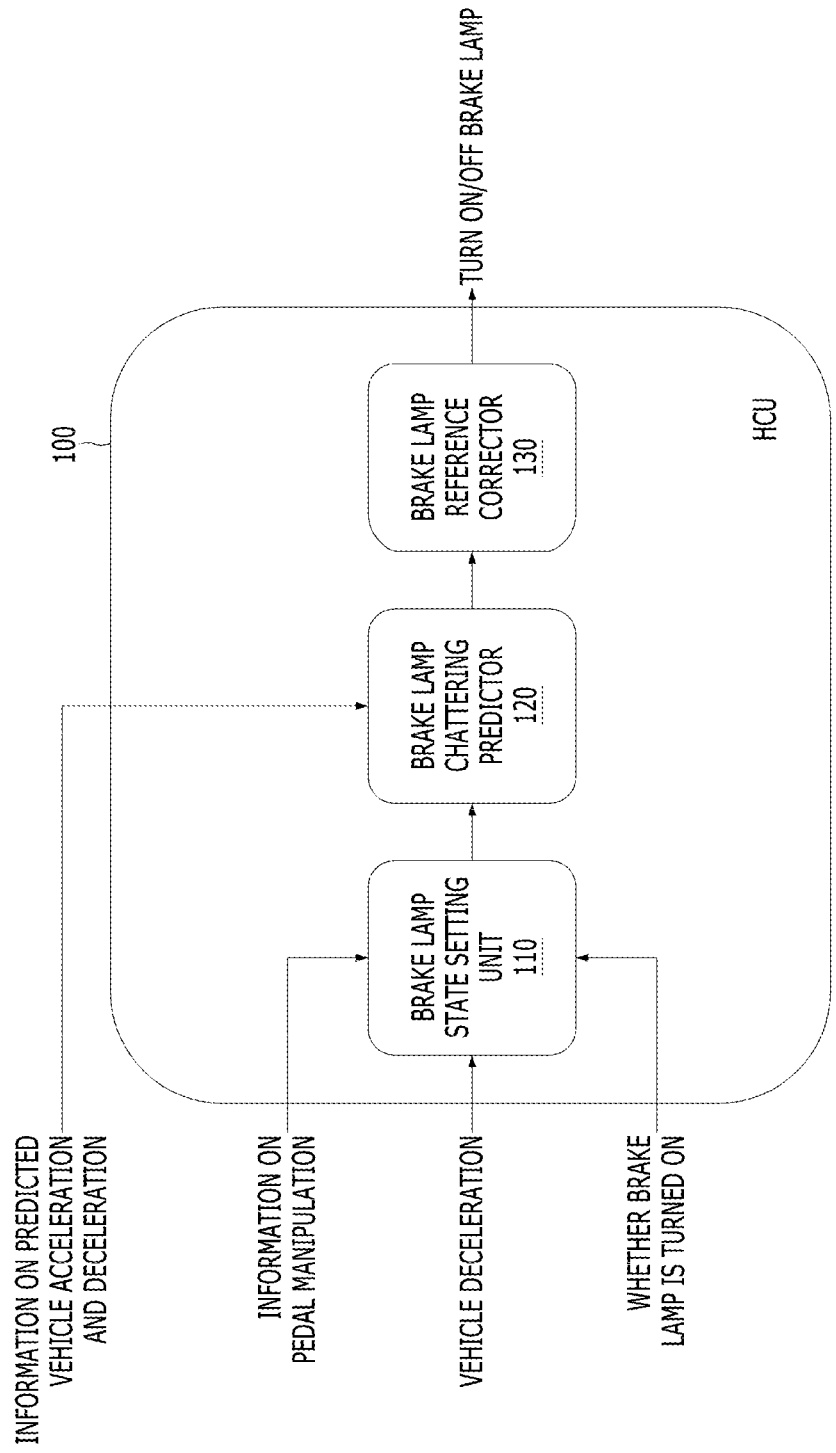

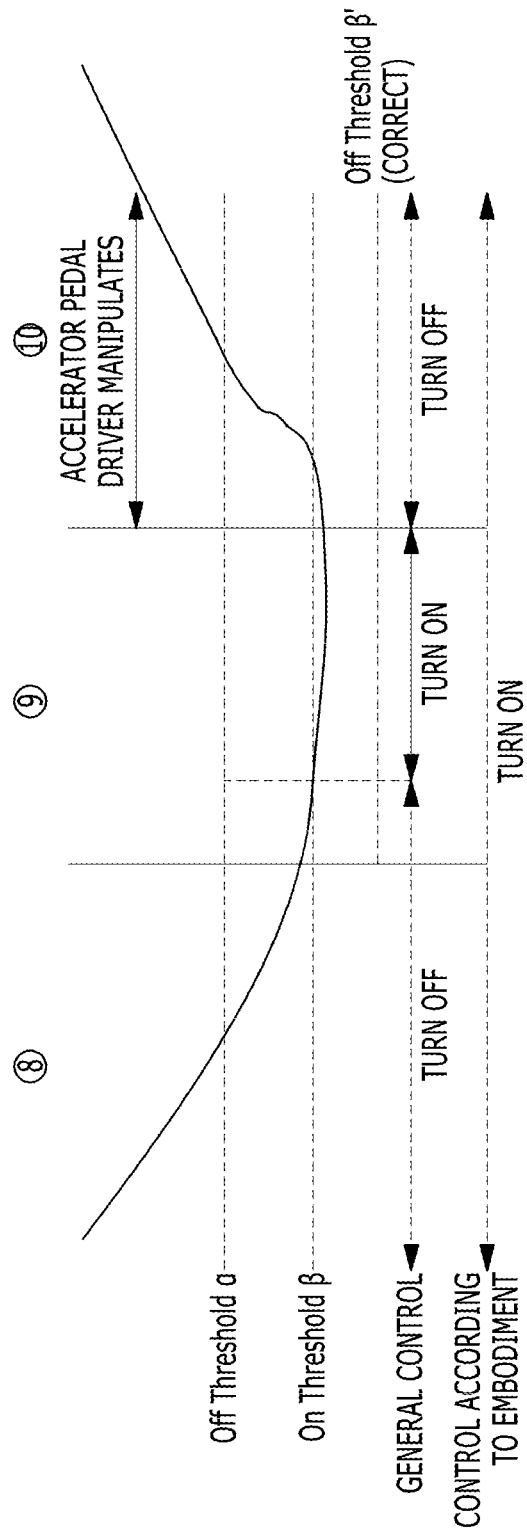

VEHICLE INCLUDING ELECTRIC MOTOR AND METHOD OF CONTROLLING BRAKE LAMP FOR THE SAME

This application is a continuation application of U.S. application Ser. No. 16/921,121, filed on Jul. 6, 2020, claims the benefit of Korean Patent Application No. 10-2019-0123649, filed on Oct. 7, 2019, which is hereby incorporated by reference as if fully set forth herein.

BACKGROUND

Field of the Disclosure

The present disclosure relates to a vehicle including an electric motor for preventing chattering of a brake lamp based on regenerative brake and a method of controlling a brake lamp for the vehicle.

Discussion of the Related Art

Coasting refers to a vehicle that is operated continuously according to inertia and the vehicle is driven without output of driving force. In general, coasting refers to driving in a state in which an accelerator pedal sensor (APS) and a brake pedal sensor (BPS) are not manipulated. Torque applied to a drive shaft during coasting may be referred to as inertia torque or coasting torque. In a general internal combustion engine vehicle, idle torque of an engine is also transmitted to a drive shaft by a torque converter and a transmission in a state in which the APS and the BPS are not engaged. This is also referred to as creep torque.

During coasting, such creep torque is transferred to the drive shaft by an engine, and simultaneously, driving load based on a vehicle speed is applied in an opposite direction to the creep torque, and in this regard, coasting torque is configured by the total of the two, which will be described with reference to FIG. 1. FIG. 1 is a diagram showing an example of a relationship between coasting torque and vehicle speed during coasting of a general vehicle according to the prior art.

Referring to FIG. 1, since a transmission is generally in a low stage in the case of a low vehicle speed, when speed of an input terminal of the transmission is less than an idle RPM of an engine, idle torque of the engine is transferred and a vehicle also travels forward by creep torque. In contrast, since a transmission is in a relatively high stage in the case of a high vehicle speed, when speed of the input terminal of the transmission is greater than the idle RPM of the engine, drag based on fuel cut of the engine is transferred and coasting torque is generated.

Recently, as interest in the environment increases, there has been a substantial amount research on hybrid electric vehicles (HEV) and electric motors, which use an electric motor as a driving source. In a vehicle including such an electric motor, an engine is not present or is not always turned on, and thus creep torque from an engine is not generated. However, generally, a motor is driven to perform control for generating creep torque to embody the characteristics of a general internal combustion engine.

Accordingly, in a vehicle including an electric motor, similarly to FIG. 1, forward torque based on idle momentum and a torque increasing effect of a torque converter of an internal combustion engine in the case of low speed is illustrated, and reverse torque based on drag of an engine from which fuel injection is stopped in the case of high speed is illustrated. An area in which the forward torque is illustrated may be referred as a creep area, and an area in which the reverse torque is illustrated may be referred as a coasting area. In particular, the reverse torque may be embodied by regenerative brake.

In a vehicle having an electric motor as a power source, such as a hybrid vehicle (HEV) or an electric vehicle (EV), a motor in addition to a conventional hydraulic friction brake is operated by a generator during brake, and thus, kinetic energy of a vehicle is converted into electric energy to enable the vehicle to brake, and this type is referred to as regenerative brake. Some currently released eco-friendly vehicles have a function of achieving an interest in driving and, simultaneously, enhancing fuel efficiency on a real road by varying a regenerative brake amount, i.e., a coasting level by a paddle shift lever.

FIG. 2 is a diagram illustrating a concept of a general coasting level according to the prior art. FIG. 2 shows a relationship between the vehicle speed and the total torque applied to the drive shaft shown in FIG. 1 for each of five different coasting torque courses. In particular, as a regenerative brake amount is increased by one stage whenever a side '−' of a paddle shift lever is pulled once, a vehicle deceleration is increased, and as the regenerative brake amount is reduced by one stage whenever a side '+' of the paddle shift lever is pulled once, a vehicle deceleration is reduced. Thus, as a coasting level is increased or a vehicle speed is reduced, a high deceleration is generated in a vehicle due to regenerative brake.

A technology referred to as one-pedal driving has been developed. This is a function that is enabled when an electronic gear shift is positioned at a specific position and by which acceleration and deceleration are adjustable by on an accelerator pedal without manipulation of a brake pedal and it is possible to stop a vehicle by completely disengaging the accelerator pedal. The present function also uses deceleration through regenerative brake.

However, recently, as the number of vehicles that generate deceleration through regenerative brake, such as eco-friendly vehicles has increased, regulations about a reference for turning on a brake lamp based on a deceleration have been enacted. In particular, according to the clause 5.2.22.4 of the regulation ECE R-13H, in the case of a vehicle employing an electronic generative brake device (e-Braking) for generating retarding force when an accelerator pedal is released, a brake lamp is required to be operated (e.g., turn on/off) depending on a vehicle deceleration value as defined in Table 1 below.

TABLE 1

| Deceleration | Operation basis | remarks |
| --- | --- | --- |
| deceleration ≤ 0.7 | Not operate | — |
| 0.7 < deceleration ≤ 1.3 | Allow to turn on | Need to turn off before deceleration < 0.7 m/s2 |
| 1.3 < deceleration | Need to turn on | |

Cases in which a brake lamp is turned on/off according to the regulation will be described below with reference to FIG. 3 of the prior art. FIG. 3 is a diagram illustrating a vehicle deceleration and whether a brake lamp is turned on or off according to the regulation of a regenerative brake device.

Referring to FIG. 3, a brake lamp based on regenerative brake is operated by setting an off threshold 'α' and an on threshold 'β' within a reference according to the regulation. The corresponding reference is determined through a test in consideration of the safety of a driver of a rear vehicle. In particular, a hysteresis margin 'A' corresponding to a difference between α and β is applied, and thus, when a vehicle deceleration through regenerative brake is changed in the vicinity of a reference deceleration, it is possible to prevent the brake lamp from being frequently turned on/off.

For example, as shown in FIG. 3, in a period ① in which a vehicle deceleration is equal to or greater than β, the brake lamp is turned off. A controller for turning the brake lamp on/off through regenerative brake sets a request for turning on the brake lamp through regenerative brake in a period ② in which a vehicle deceleration is less than β, and resets the request for turning on the brake lamp in a period ③ in which the vehicle deceleration is reduced to α or less. However, irrespective of whether a specific controller sets a request for turning on a brake lamp based on a vehicle deceleration, when a driver manipulates an accelerator pedal, the brake lamp is not turned on. In contrast, even in a state in which the request for turning on the brake lamp is reset, when a brake pedal is manipulated, the brake lamp is turned on. In other words, in general, an operation of a brake lamp based on driver manipulation of a pedal is prioritized over an operation of the brake lamp through regenerative brake.

Thus, a so-called chattering by which a brake lamp is repeatedly turned on and off within a short period of time in a situation, for example, when a brake pedal is manipulated before and after the period ② in which the request for turning on the brake lamp through regenerative brake is set or an accelerator pedal is manipulated in the period ② in which the request for turning on the brake lamp is set. For example, the brake lamp is turned on during deceleration at low speed through regenerative brake, but as vehicle speed is sufficiently reduced and coasting torque is reduced, the brake lamp may be turned on. However, when a driver intends to stop a vehicle, if the brake lamp is turned on again by manipulating a brake pedal immediately after the brake lamp is turned off, chattering occurs.

Needless to say, such chattering also occurs when a hysteresis is set with a narrow width. However, when a hysteresis is set with a wide width to prevent chattering, a brake lamp is turned on or off if necessary in the case of the same deceleration, and thus, a driver experiences unfamiliarity and safety of a rear driver and the driver is threatened. In addition, when the brake lamp is frequently turned on/off, this causes an unpleasant sensation to the rear driver and the marketability of a vehicle is degraded.

SUMMARY

Accordingly, the present disclosure provides a vehicle that may include an electric motor configured to prevent chattering when a brake lamp is operated based on regenerative brake and a method of operated a brake lamp for the vehicle. The technical problems solved by the exemplary embodiments are not limited to the above technical problems and other technical problems which are not described herein will become apparent to those skilled in the art from the following description.

To achieve these objects and other advantages and in accordance with the purpose of the invention, as embodied and broadly described herein, a method of controlling a brake lamp of a vehicle having an electric motor as a power source may include determining whether a deceleration of the vehicle based on regenerative brake through the electric motor is present in a hysteresis period between an off threshold as a reference for turning off a brake lamp and an on threshold as a reference for turning on the brake lamp, when the deceleration of the vehicle is present in the hysteresis period, determining a state of the brake lamp before the deceleration of the vehicle enters the hysteresis period, and when determining that the brake lamp is turned on or off for a reason except for the regenerative brake before the deceleration of the vehicle enters the hysteresis period, setting or resetting a request for turning on the brake lamp based on the regenerative brake in response to the determined state of the brake lamp.

In another aspect of the present disclosure, a vehicle may include an electric motor configured to provide regenerative brake force, and a controller. The controller may include a brake lamp state setting unit configured to, when a deceleration of the vehicle based on regenerative brake through the electric motor is present in a hysteresis period between an off threshold as a reference for turning off a brake lamp and an on threshold as a reference for turning on the brake lamp, determine a state of the brake lamp before the deceleration of the vehicle enters the hysteresis period, and configured to, in response to determining that the brake lamp is turned on or off for a reason except for the regenerative brake before the deceleration of the vehicle enters the hysteresis period, set or reset a request for turning on the brake lamp based on the regenerative brake in response to the determined state of the brake lamp.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIGS. 4A and 4B are diagrams showing an example of a configuration of a controller according to an exemplary embodiment of the present disclosure;

FIG. 9 is a diagram showing another example of a case in which a brake lamp is controlled depending on a deceleration and pedal manipulation according to an exemplary embodiment of the present disclosure;

DETAILED DESCRIPTION

Figure 1:
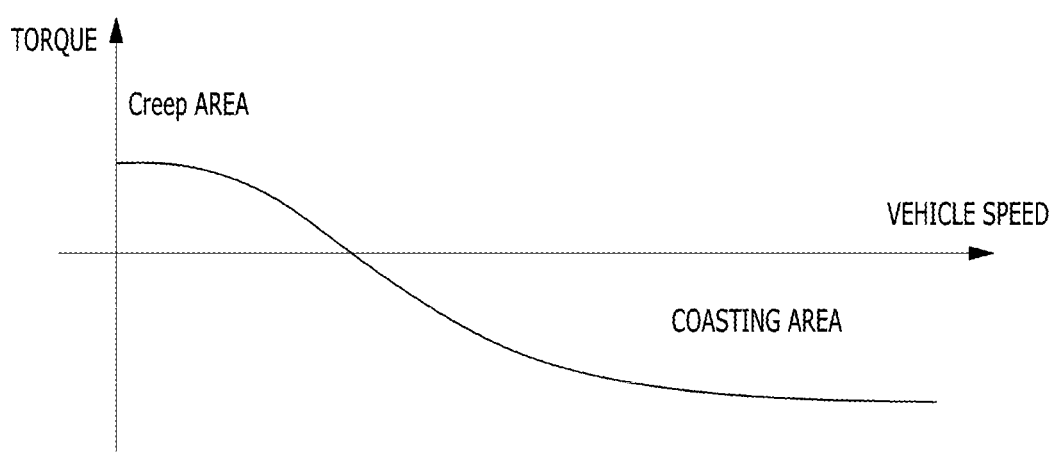
FIG. 1 is a diagram showing an example of a relationship between coasting torque and vehicle speed during coasting of a general vehicle according to the prior art.
Figure 2:
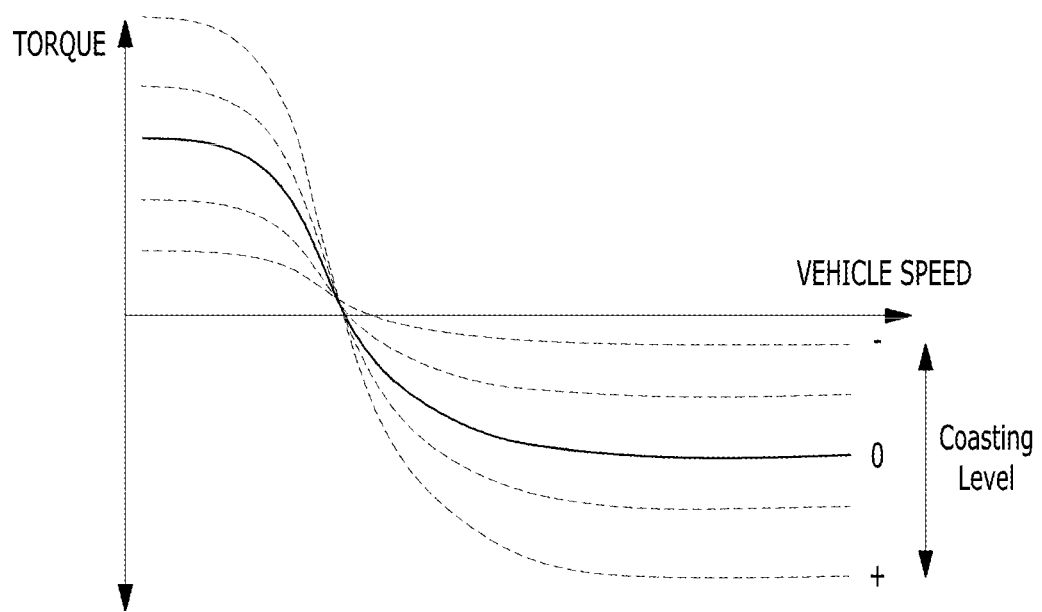
FIG. 2 is a diagram illustrating a concept of a general coasting level according to the prior art.
Figure 3:
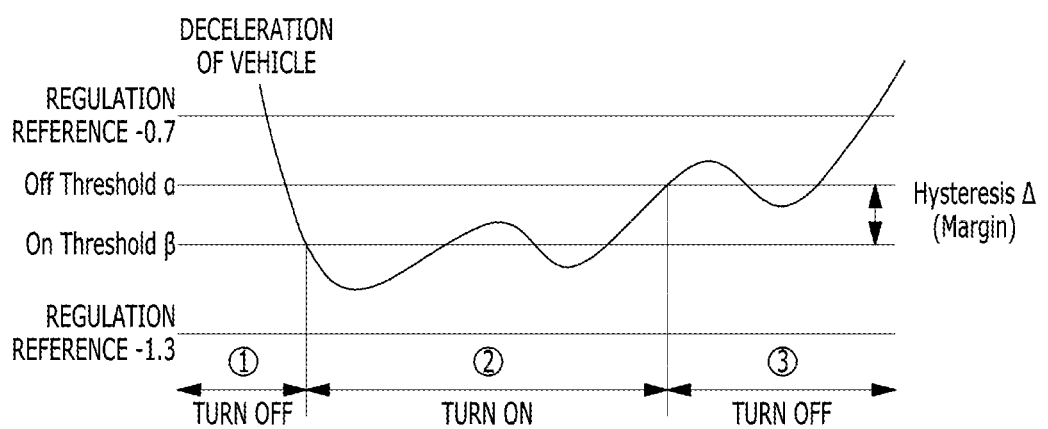
FIG. 3 is a diagram illustrating a vehicle deceleration and whether a brake lamp is turned on or off according to the regulation of a regenerative brake device according to the prior art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present disclosure will be described in detail with reference to the accompanying drawings to be easily implemented by those skilled in the art. However, the present disclosure may be variously implemented and is not limited to the exemplary embodiments described herein. In the drawings, in order to clearly describe the present disclosure, portions which are not related to the description of the present disclosure will be omitted and similar portions are denoted by similar reference numerals throughout the specification.

An exemplary embodiment of the present disclosure prevents chattering by correcting a setting for turning on a brake lamp based on whether the brake lamp is turned on and pedal manipulation and changing a threshold reference for deceleration at a time point at which chattering is predicted to occur. First, a configuration of a controller for preventing chattering of a brake lamp will be described with reference to FIGS. 4A and 4B.

Figure 4B:
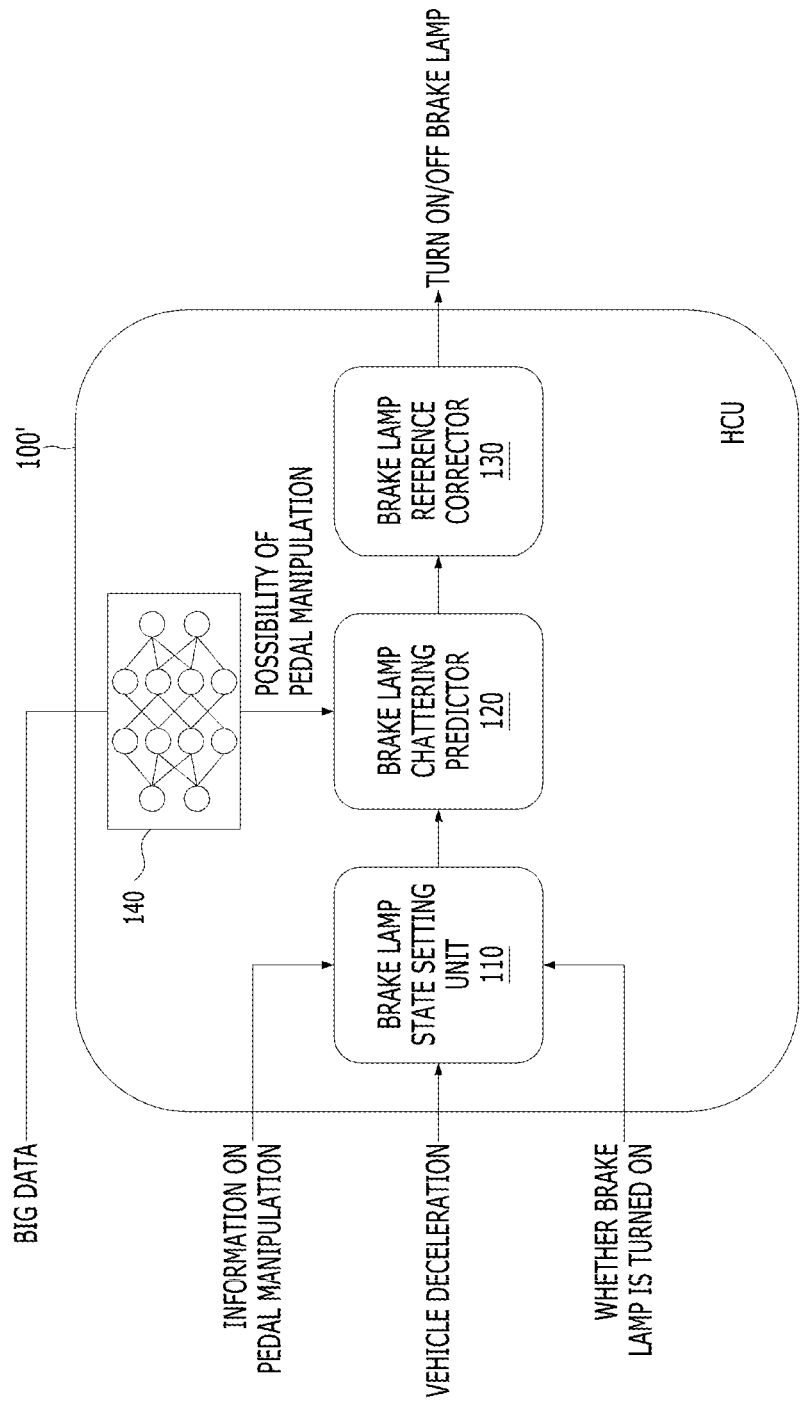

FIGS. 4A and 4B are diagrams showing an example of a configuration of a controller according to an exemplary embodiment of the present disclosure. First, referring to FIG. 4A, a controller 100 configured to operate a brake lamp through regenerative brake according to an exemplary embodiment may lastly determine (i.e., an output value) whether a brake lamp is turned on or off using, as an input value, information regarding predicted vehicle acceleration and deceleration, information regarding pedal manipulation, information regarding vehicle deceleration, and information regarding whether the brake lamp is turned on. Accordingly, the controller 100 may include a brake lamp state setting unit 110, a brake lamp chattering predictor 120, and a brake lamp reference corrector 130.

The aforementioned components of the controller 100 are components required to determine whether the brake lamp is turned on/off based on deceleration through regenerative brake, and thus, an actual controller may include greater or fewer components as necessary. The information regarding predicted vehicle acceleration and deceleration may include a type of a road on which a vehicle currently being driven, a speed limit, whether a deceleration event (e.g., a curve curvature, a speed bump, and a speed camera) is present and a position of the deceleration event, real-time traffic information, traffic signal (e.g., a signal light) information, or surrounding vehicle information, but this is merely exemplary and the present disclosure is not limited thereto, and thus, the information regarding predicted vehicle acceleration and deceleration may include any information as long as the information is used to predict acceleration and deceleration of a vehicle.

For example, a road type, a speed limit, whether a deceleration event is present and a position of the deceleration event, real-time traffic information, traffic signal, or the like may be acquired using a navigation system, a telematics system, or the like, and the surrounding vehicle information may be acquired from an advanced driver assistance system (ADAS) or the like. Further, the information regarding pedal manipulation may be acquired from an accelerator pedal sensor (APS) and a brake pedal sensor (BPS), and whether the brake lamp is turned on may be determined based on the current state of setting/resetting of turning on the brake lamp based on regenerative brake of the corresponding controller 100 and the pedal manipulation information. In addition, the information regarding vehicle deceleration may be acquired using an accelerator sensor but the present disclosure is not limited thereto.

The controller 100 may be embodied as a hybrid control unit (HCU) for a hybrid vehicle and may be vehicle control unit (VCU) for an electric vehicle, but the present disclosure is not limited thereto. As shown in FIG. 4B, a controller 100' according to an exemplary embodiment may further include an artificial intelligence model unit 140 configured to predict the possibility of pedal manipulation based on big data rather than predicting acceleration and deceleration based on the predicted acceleration and deceleration information.

Hereinafter, an operation of each component of the controller 100 will be described in detail with reference to FIGS. 5 and 6. In the following description, for convenience of description, the controller 100 may be assumed to be a hybrid control unit (HCU). First, the brake lamp state setting unit 110 may be configured to determine whether the state of the brake lamp is maintained when the brake lamp is set for a reason (e.g., driver manipulation of a pedal or an operation of a posture control device) except for regenerative brake.

For example, the brake lamp state setting unit 110 may be configured to set the request for turning on the brake lamp through regenerative brake when deceleration of a vehicle is within hysteresis and the brake lamp may be pre-turned on (e.g., turned on ahead of time) due to driver manipulation of a brake pedal, a posture control device (ESP, ESC, or VDC), or the like. In contrast, the brake lamp state setting unit 110 may be configured to reset the request for turning on the brake lamp when deceleration of the vehicle is within hysteresis and the brake lamp is turned off, thereby preventing chattering due to a difference between a time point at which a driver manipulates a pedal and a state in which the brake lamp is turned on through regenerative brake within a hysteresis period. This will be described with reference to FIG. 5.

Figure 5A:
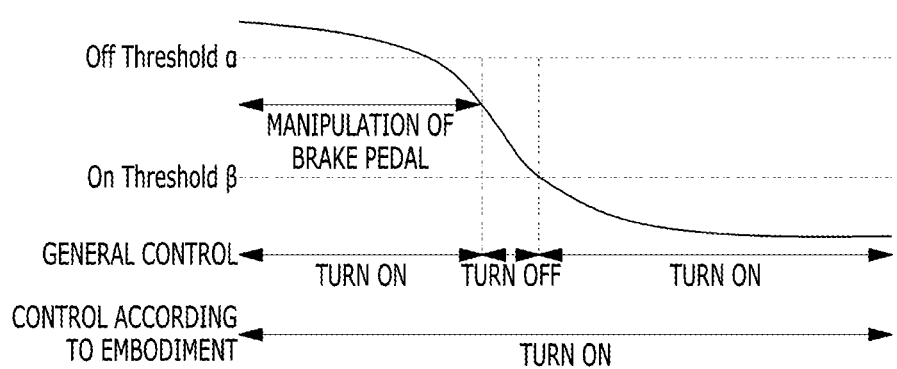
FIGS. 5A-5B are diagrams illustrating an operation of a brake lamp state setting unit of a controller according to an exemplary embodiment of the present disclosure.
Figure 5B:
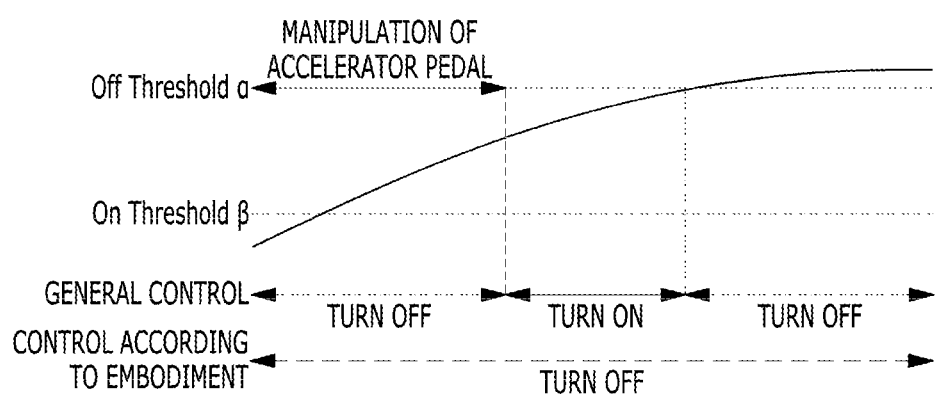

FIGS. 5A-5B are diagrams illustrating an operation of a brake lamp state setting unit of a controller according to an exemplary embodiment of the present disclosure. In the following description including a description of FIGS. 5A-5B, it may be assumed that an off threshold 'a' and an on threshold 13' are set within a range that satisfies a reference according to the regulation in a default state in which correction according to an exemplary embodiment is not applied.

First, referring to FIG. 5A, a brake lamp may be turned on irrespective of a deceleration in a state in which a brake pedal is manipulated, and even when the deceleration enters a hysteresis period, the brake lamp may be turned off in general control before the acceleration and deceleration is less than the on threshold, and the brake lamp may be re-turned on when the deceleration is less than the on threshold, and accordingly, chattering occurs. In contrast, when entering a state in which the brake lamp is reset in a hysteresis period, the brake lamp state setting unit 110 according to an exemplary embodiment may be configured to set the request for turning on the brake lamp through regenerative brake in the hysteresis period, and thus, the state in which the brake lamp is turned on may be maintained, thereby preventing chattering.

Hereinafter, referring to FIG. 5B, the brake lamp may be turned off irrespective of a deceleration in a state in which an accelerator pedal is manipulated. In general control, when the accelerator pedal is reset, a state in which the brake lamp is turned on may be maintained until the deceleration is equal to or greater than an off threshold, and as the deceleration is equal to or greater than the off threshold, the brake lamp may be re-turned off, and accordingly, chattering occurs. In contrast, when entering a state in which the brake lamp is turned on in a hysteresis period, the brake lamp state setting unit 110 according to an exemplary embodiment may be configured to reset the request for turning on the brake lamp through regenerative brake in the hysteresis period, and thus, a state in which the brake lamp is turned off may be maintained, thereby preventing chattering.

When a time point at which a deceleration is reduced and the brake lamp is required to be turned off is reached in a state (i.e., deceleration reaches a value less than the on threshold) in which the brake lamp is turned on due to deceleration through regenerative brake, the brake lamp chattering predictor 120 may be configured to determine whether a driver manipulates or engages a brake pedal within a preset time based on the information regarding predicted vehicle acceleration and deceleration and may be configured to predict whether chattering occurs. In contrast, when a time point at which a deceleration is increased and the brake lamp is required to be turned on is reached in a state in which the brake lamp is turned off, the brake lamp chattering predictor 120 may be configured to determine whether the driver manipulates or engages an accelerator pedal within a preset time based on the information regarding predicted vehicle acceleration and deceleration and may be configured to predict whether chattering occurs.

For example, the brake lamp chattering predictor 120 may be configured to predict driver manipulation of an accelerator pedal in a situation, for example, immediately after a vehicle passes through a speed camera, immediately after the vehicle passes through a speed bump, immediately after the vehicle passes a corner, and when a front signal light is changed to green from red (e.g., changes from stop to go) by decelerating the vehicle while the vehicle is driven at a speed equal to or greater than a speed limit. In another example, the brake lamp chattering predictor 120 may be configured to predict driver manipulation of a brake pedal in a situation, for example, when a distance from a leading vehicle is reduced to a predetermined distance, when a speed camera is positioned forward and a vehicle speed is greater than a speed limit, when a speed bump is positioned forward, when a front signal light is red (e.g. stop), or when a curved road with a high curvature compared with a vehicle speed is present.

The brake lamp reference corrector 130 may be configured to correct the off threshold to a high value with respect to chattering predicted based on driver manipulation or engagement of a brake pedal to maintain a state in which the brake lamp is turned on, thereby preventing chattering. In contrast, the brake lamp reference corrector 130 may be configured to correct the on threshold to a low value with respect to chattering predicted based on driver manipulation or engagement of an accelerator pedal to maintain a state in which the brake lamp is turned off, thereby preventing chattering. In particular, a degree of the correction may be varied based on an acceleration/deceleration degree, a manipulation possibility of each pedal, or the like of the information on predicted vehicle acceleration and deceleration.

Figure 6A:
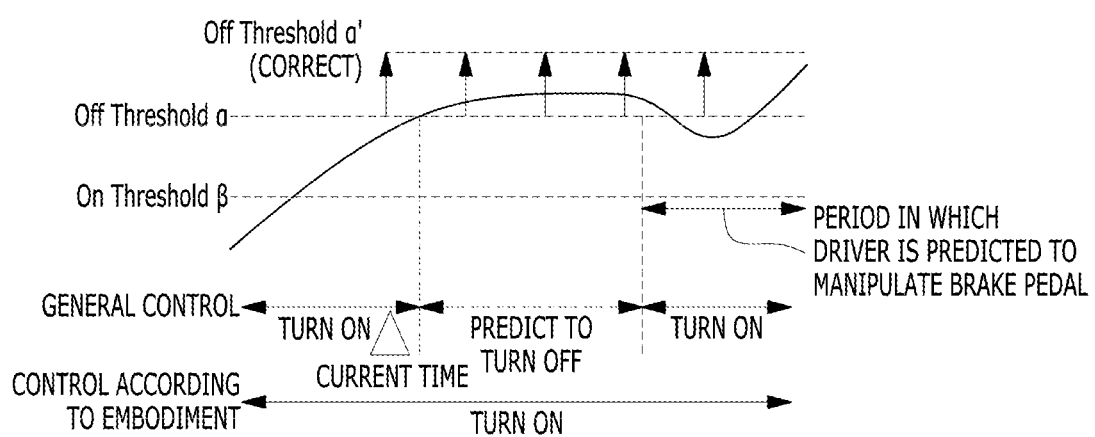
FIGS. 6A-6B are diagrams illustrating an operation of a brake lamp reference corrector based on prediction of chattering of a brake lamp chattering predictor according to an exemplary embodiment of the present disclosure.
Figure 6B:
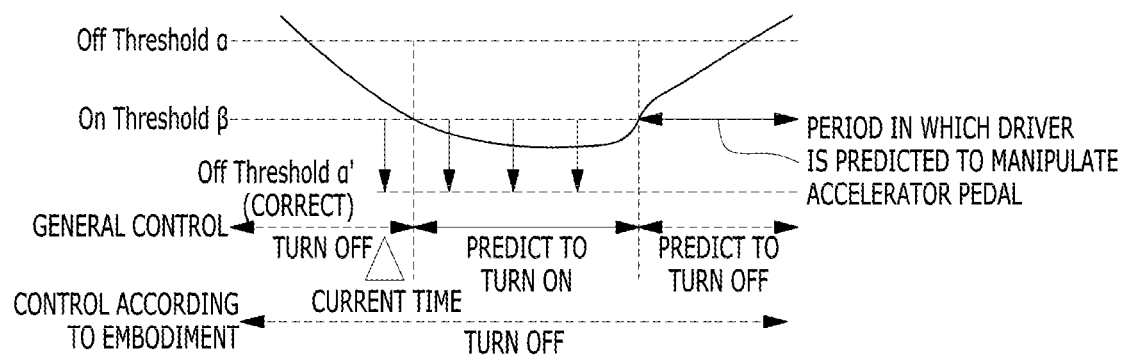

The aforementioned operation forms of the brake lamp chattering predictor 120 and the brake lamp reference corrector 130 will be described again with reference to an example of FIGS. 6A-6B. FIGS. 6A-6B are diagrams illustrating an operation of a brake lamp reference corrector based on prediction of chattering of a brake lamp chattering predictor according to an exemplary embodiment of the present disclosure.

First, referring to FIG. 6A, when a time point (i.e., a current time) at which a deceleration is reduced and the brake lamp is required to be turned off is reached in a state (i.e., deceleration reaches a value less than the on threshold) in which the brake lamp is turned on due to deceleration through regenerative brake, the brake lamp chattering predictor 120 may be configured to determine whether a driver manipulates or engages a brake pedal within a preset time based on the information regarding predicted vehicle acceleration and deceleration and may be configured to predict whether chattering occurs. As the prediction result, in response to determining that chattering is predicted to occur due to manipulation of a brake pedal, the brake lamp reference corrector 130 may be configured to correct the off threshold to a higher value α' than a default value α to maintain the state in which the brake lamp is turned on in a period in which the brake lamp is predicted to be turned off, thereby preventing chattering.

Hereinafter, referring to FIG. 6B, when a time point (i.e., a current time) at which the brake lamp is required to be turned on due to deceleration through regenerative brake is reached in a state in which the brake lamp is turned off, the brake lamp chattering predictor 120 may be configured to determine whether the driver manipulates or engages an accelerator pedal within a preset time based on the information regarding predicted vehicle acceleration and deceleration may be configured to predict whether chattering occurs. As the prediction result, in response to determining that chattering is predicted to occur due to manipulation of an accelerator pedal, the brake lamp reference corrector 130 may be configured to correct the on threshold to a lower value β' than a default value β to maintain the state in which the brake lamp is turned off in a period in which the brake lamp is predicted to be turned off, thereby preventing chattering.

Hereinafter, a detailed case in which a brake lamp control operation for preventing chattering is performed will be described with reference to FIGS. 7 to 10. First, a case in which chattering is prevented by maintaining a brake lamp to be tuned on will be described with reference to FIGS. 7 and 8A-8C.

Figure 7:
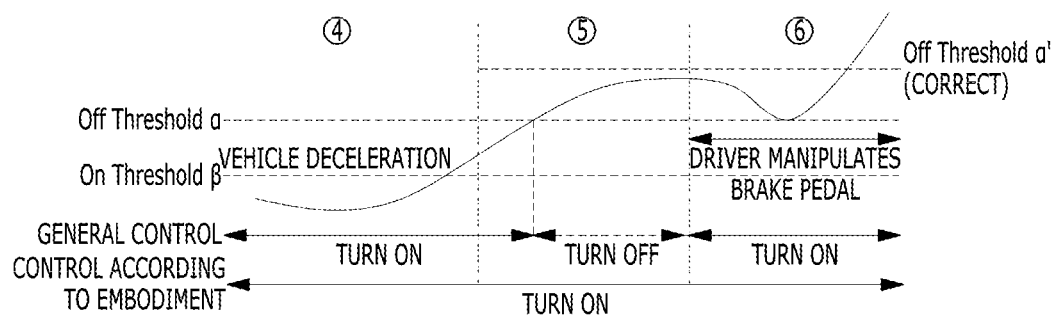
FIG. 7 is a diagram showing an example of a control in which brake lamp is controlled depending on a deceleration and pedal manipulation according to an exemplary embodiment of the present disclosure.
Figure 8A:
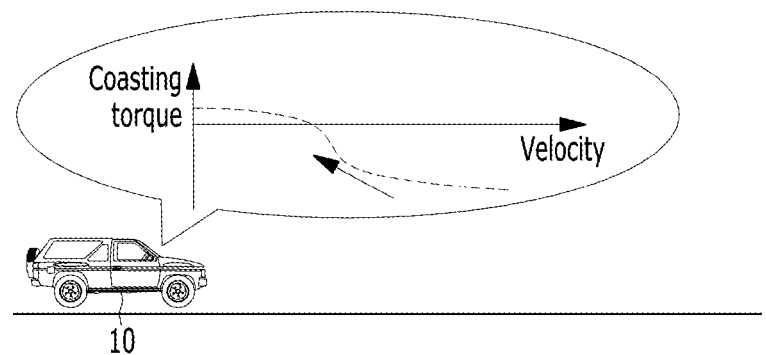
FIGS. 8A-8C are diagrams showing an example of a driving situation corresponding to FIG. 7 according to an exemplary embodiment of the present disclosure.
Figure 8B:
Figure 8C:
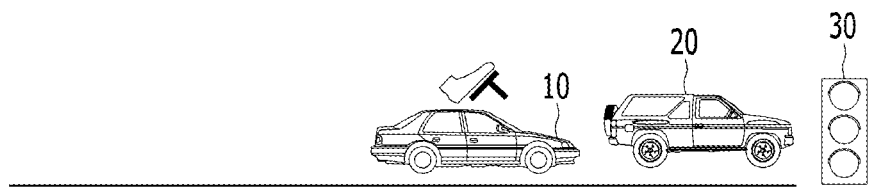

FIG. 7 is a diagram showing an example of a control in which brake lamp is controlled or operated based on a deceleration and pedal manipulation according to an exemplary embodiment of the present disclosure. FIGS. 8A-8C are diagrams showing an example of a driving situation corresponding to FIG. 7. It may be assumed that a period ④ of FIG. 7 corresponds to a situation of FIG. 8A, a period ⑤ of FIG. 7 corresponds to a situation of FIG. 8B, and a period ⑥ of FIG. 7 corresponds to a situation of FIG. 8C.

First, in the period ④ of FIG. 7, that is, in the situation of FIG. 8A, a vehicle 10 may be decelerated through coasting in a coasting period. However, coating torque is reduced due to deceleration, and thus, a deceleration of the vehicle may also be reduced. In particular, the current situation is not a situation in which a state of a brake lamp is set for the reason (e.g., driver manipulation of a pedal or an operation of a posture control device) except for regenerative brake when a deceleration of the vehicle enters hysteresis, and thus, the brake lamp state setting unit 110 may not intervene.

In the period ⑤ of FIG. 7, that is, in the situation of FIG. 8B, as a leading vehicle 20 is detected to stop through an ADAS before a deceleration of the vehicle 10 reaches the off threshold, the brake lamp chattering predictor 120 may be configured to predict chattering according to manipulation or engagement of a brake pedal. According to prediction of chattering, the brake lamp reference corrector 130 may be configured to correct the off threshold to a higher value α' than a default value α.

Then, in the period ⑥ of FIG. 7, that is, in the situation of FIG. 8C, a driver experiencing reduction in coasting torque based on a vehicle speed may manipulate a brake pedal to stop a vehicle before collision with the leading vehicle 20. Particularly, the brake lamp reference corrector 130 be configured to correct the off threshold to a high value, and thus, a state in which the brake lamp is turned on may be maintained until a brake pedal is manipulated to prevent chattering, and the vehicle 10 may be completely stopped, and thus, a deceleration may converge to 0. In the situation described with reference to FIGS. 7 and 8A-8C, signal information of a front signal light 30 may be acquired and applied in a similar way even if there is no leading vehicle 20.

Figure 10A:
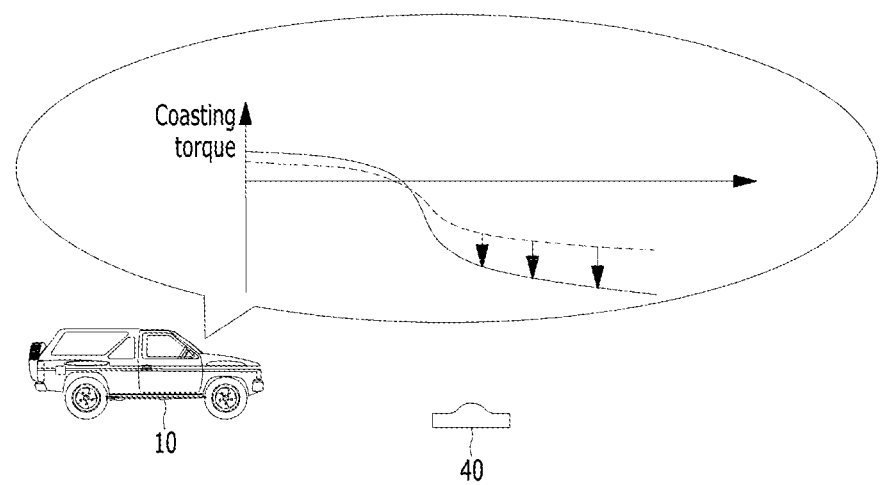
FIGS. 10A-10C are diagrams showing an example of a driving situation corresponding to FIG. 9 according to an exemplary embodiment of the present disclosure.
Figure 10B:
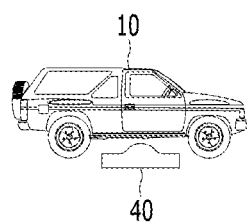
Figure 10C:
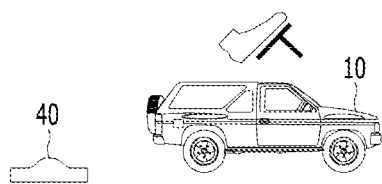

Hereinafter, a case in which chattering is prevented by maintaining a brake state to be turned off will be described with reference to FIGS. 9 and 10A-10C. FIG. 9 is a diagram showing another example of a case in which a brake lamp is operated based on a deceleration and pedal manipulation according to an exemplary embodiment of the present disclosure. FIGS. 10A-10C are diagrams showing an example of a driving situation corresponding to FIG. 9. It may be assumed that a period of ⑧ FIG. 9 corresponds to a situation of FIG. 10A, a period ⑨ of FIG. 9 corresponds to a situation of FIG. 10B, and a period ⑩ of FIG. 9 corresponds to a situation of FIG. 10C.

First, in the period ⑧ of FIG. 9, that is, in the situation of FIG. 10A, as a driver of the vehicle 10 detects a speed bump 40 positioned forward of the vehicle and increases a coasting level for deceleration, coasting torque may be increased and a deceleration of a vehicle may be reduced. In particular, the current situation is not a situation in which a state of a brake lamp is set for the reason (e.g., driver manipulation of a brake pedal) except for regenerative brake when a deceleration of the vehicle enters hysteresis, and thus, the brake lamp state setting unit 110 may not intervene.

In the period ⑨ of FIG. 9, that is, in the situation of FIG. 10B, when the driver detects that the vehicle currently passes through a speed bump through a pitching motion using navigation information or acceleration information of the vehicle before a deceleration of the vehicle 10 reaches the on threshold, the brake lamp chattering predictor 120 may be configured to predict that chattering due to manipulation of an accelerator pedal within a preset threshold time. According to the prediction of chattering, the brake lamp reference corrector 130 may be configured to correct the on threshold to a lower value β' than a default value β.

Then, in the period ⑩ of FIG. 9, that is, in the situation of 10C, the driver manipulates an accelerator pedal for re-acceleration after passing through the speed bump 40. In particular, the brake lamp reference corrector 130 may be configured to correct the on threshold to a lower value, and thus, a state in which the brake lamp is turned off may be maintained until the accelerator pedal is manipulated, thereby preventing chattering. The operation described with reference to FIGS. 9 and 10A-10C may be applied in a similar way to a sharp curve period, an onramp period, a speed camera period, or the like.

Figure 11:
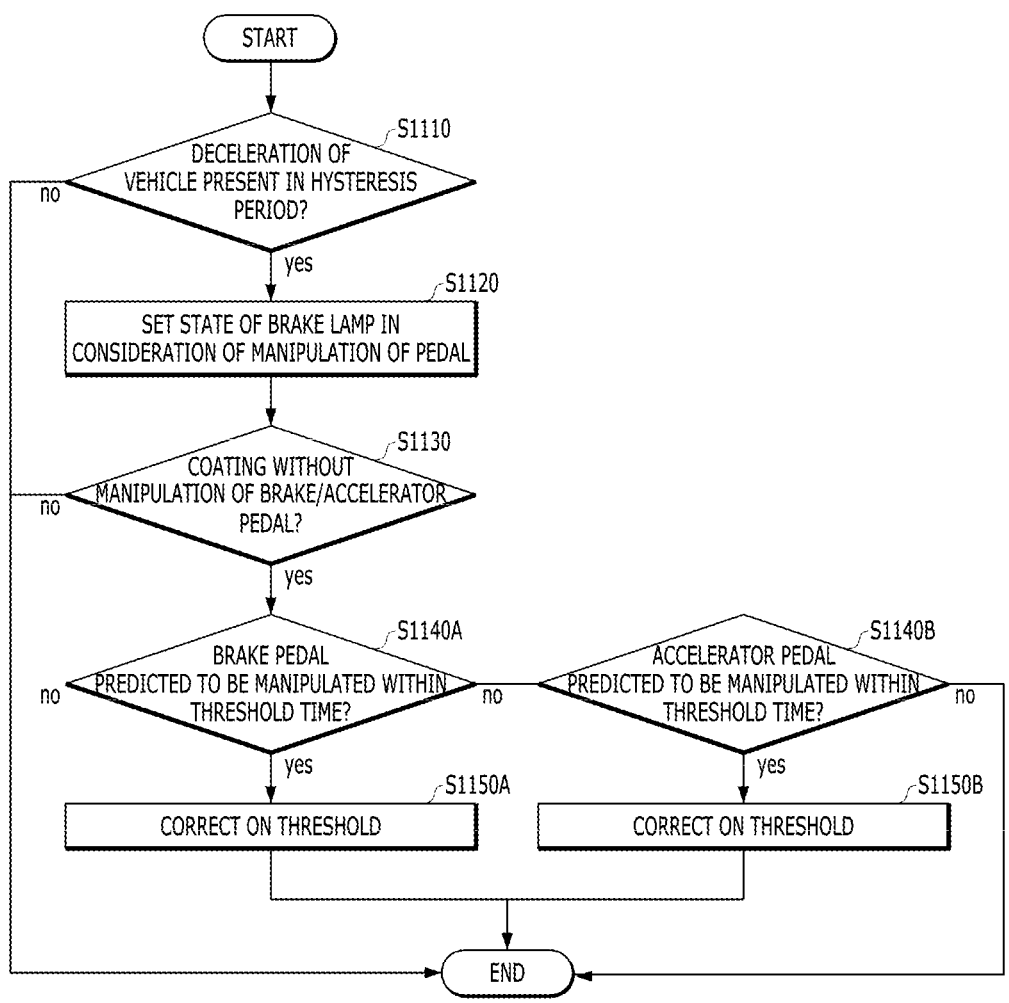
FIG. 11 is a flowchart showing an example of a brake lamp control operation according to an exemplary embodiment of the present disclosure.

The operation for controlling the brake lamp described thus far is summarized in a flowchart of FIG. 11. FIG. 11 is a flowchart showing an example of a brake lamp control operation according to an exemplary embodiment of the present disclosure. Referring to FIG. 11, the brake lamp state setting unit 110 may be configured to determine whether a deceleration of a vehicle through regenerative brake is present in a hysteresis period (S1110).

When the deceleration is present in the hysteresis period (YES of S1110), the brake lamp state setting unit 110 may be configured to set or reset a request for turning on a brake lamp based on whether the brake lamp is turned on or off for the reason except for regenerative brake, for example, pedal manipulation when the vehicle deceleration enters the hysteresis period. When coasting without manipulation of brake/accelerator pedal is performed, that is, when regenerative brake is performed without intervention of a pedal (YES of S1130), the brake lamp chattering predictor 120 may be configured to predict whether chattering occurs based on whether the brake pedal or the accelerator pedal is manipulated within a threshold time (S1140A and S1140B).

For example, when a deceleration is reduced in a state in which the brake lamp is turned off, when the deceleration approaches the on threshold, and when a deceleration is increased in a state in which the brake lamp is turned on, when the deceleration approaches the off threshold, the brake lamp chattering predictor 120 may be configured to determine whether a pedal is manipulated within a preset threshold time. In particular, it would be obvious to one of ordinary skill in the art that the threshold time is variously set based on a variation in deceleration per hour, the size of a regenerative brake amount, a coasting level, or a form or situation of information on predicted acceleration and deceleration.

When a brake pedal is predicted to be manipulated within the threshold time in a situation in which a deceleration is increased (YES of S1140A), the brake lamp reference corrector 130 may be configured to correct the off threshold to a high value (S1150A), and when an accelerator pedal is predicted to be manipulated in a situation in which a deceleration is reduced (YES of S1140B), the brake lamp reference corrector 130 may be configured to correct the on threshold to a low value (S1150B), thereby preventing chattering of the brake lamp.

In the aforementioned exemplary embodiments, when the regulations are reinforced to be satisfied, a value obtained by correcting the off threshold to a high value or a value obtained by correcting the on threshold to a low value may be set within a deceleration range determined in the regulation. A vehicle related to at least one exemplary embodiment of the present disclosure as configured above may effectively prevent chattering by correcting the on threshold based on setting of a state of turning on a brake lamp and a vehicle deceleration.

It will be appreciated by persons skilled in the art that that the effects that could be achieved with the present disclosure are not limited to what has been particularly described hereinabove and other advantages of the present disclosure will be more clearly understood from the detailed description.

The invention may also be embodied as computer readable code on a non-transitory computer readable recording medium. The non-transitory computer readable recording medium is any data storage device that may store data which may thereafter be read by a computer system. Examples of the non-transitory computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of controlling a brake lamp of a vehicle including an electric motor as a power source, comprising:
   determining, by a controller, whether a deceleration of the vehicle falls within a hysteresis region between an off threshold as a reference for turning off a brake lamp and an on threshold as a reference for turning on the brake lamp;
   determining, by the controller, a state of the brake lamp being turned on or off before or while the deceleration of the vehicle is in the hysteresis region; and
   setting or resetting, by the controller, a request for turning on the brake lamp for a regenerative brake based on the determined state of the brake lamp being turned on or off.

2. A non-transitory computer-readable recording medium having recorded thereon a program for executing the method of claim 1.

3. The method of claim 1, wherein the setting or resetting of the request for turning on the brake lamp for the regenerative brake is performed in response to determining that the brake lamp is turned on or off for a reason except for the regenerative brake, and
   wherein the reason except for the regenerative brake includes at least one of intervention of a posture control device, manipulation of an accelerator, or manipulation of a brake pedal.

4. The method of claim 1, wherein, when the determined state of the brake lamp is a turned-on state in which the brake lamp is turned on, the setting or resetting is performed to set the request for turning on the brake lamp.

5. The method of claim 1, wherein, when the determined state of the brake lamp is a turned-off state in which the brake lamp is turned off, the setting or resetting is performed to reset the request for turning on the brake lamp.

6. The method of claim 1, further comprising:
   in response to determining that the deceleration of the vehicle through the regenerative brake approaches the on threshold or the off threshold in a coasting situation, predicting, by the controller, whether a pedal is manipulated within a preset time; and
   correcting, by the controller, the on threshold or the off threshold depending on a prediction result.

7. The method of claim 6, wherein the predicting includes predicting whether a brake pedal is manipulated within the preset time before the deceleration of the vehicle reaches the off threshold when the deceleration of the vehicle through the regenerative brake is increased in a turned-on state in which the brake lamp is turned on.

8. The method of claim 7, wherein the correcting includes raising the off threshold in response to predicting that the brake pedal is manipulated as the prediction result.

9. The method of claim 6, wherein the predicting includes predicting whether an accelerator pedal is manipulated within the preset time before the deceleration of the vehicle reaches the on threshold when the deceleration of the vehicle through the regenerative brake is reduced in a turned-off state in which the brake lamp is turned off.

10. The method of claim 9, wherein the correcting includes lowering the on threshold in response to predicting that the accelerator pedal is manipulated as the prediction result.

11. A vehicle, comprising:
    an electric motor configured to provide regenerative brake force; and
    a controller configured to, in response to determining that a deceleration of the vehicle falls within a hysteresis region between an off threshold as a reference for turning off a brake lamp and an on threshold as a reference for turning on the brake lamp, determine a state of the brake lamp being turned on or off before or while the deceleration of the vehicle is in the hysteresis region, wherein the controller is configured to set or reset a request for turning on the brake lamp for a regenerative brake based on the determined state of the brake lamp being turned on or off.

12. The vehicle of claim 11, wherein the controller is further configured to set or reset the request for turning on the brake lamp for the regenerative brake based on the determined state of the brake lamp being turned on or off in response to determining that the brake lamp is turned on or off for a reason except for the regenerative brake, and wherein the reason except for the regenerative brake includes at least one of intervention of a posture control device, manipulation of an accelerator, or manipulation of a brake pedal.

13. The vehicle of claim 11, wherein, in response to determining that the determined state of the brake lamp is a state in which the brake lamp is turned on, the controller is configured to set the request for turning on the brake lamp.

14. The vehicle of claim 11, wherein, in response to determining that the determined state of the brake lamp is a state in which the brake lamp is turned off, the controller is configured to reset the request for turning on the brake lamp.

15. The vehicle of claim 11, wherein the controller incudes:

a brake lamp chattering predictor configured to, in response to determining that the deceleration of the vehicle through the regenerative brake approaches the on threshold or the off threshold in a coasting situation, predict whether a pedal is manipulated within a preset time; and a brake lamp reference corrector configured to correct the on threshold or the off threshold depending on a prediction result.

16. The vehicle of claim 15, wherein the brake lamp chattering predictor is configured to predict whether a brake pedal is manipulated within the preset time before the deceleration of the vehicle reaches the off threshold when the deceleration of the vehicle through the regenerative brake is increased in a turned-on state in which the brake lamp is turned on.

17. The vehicle of claim 16, wherein the brake lamp reference corrector is configured to raise the off threshold in response to predicting that the brake pedal is manipulated as the prediction result of the brake lamp chattering predictor.

18. The vehicle of claim 15, wherein the brake lamp chattering predictor is configured to predict whether an accelerator pedal is manipulated within the preset time before the deceleration of the vehicle reaches the on threshold in a situation in which the deceleration of the vehicle through the regenerative brake is reduced in a state in which the brake lamp is turned off.

19. The vehicle of claim 18, wherein the brake lamp reference corrector is configured to lower the on threshold in response to predicting that the accelerator pedal is manipulated as the predict result of the brake lamp chattering predictor.

* * * * *